United States Patent [19]

Winter

[11] Patent Number: 5,621,261

[45] Date of Patent: Apr. 15, 1997

[54] MOTOR AND/OR GENERATOR OPERATING ON THE RELUCTANCE PRINCIPLE

[75] Inventor: Udo Winter, Kürnach, Germany

[73] Assignee: Siemens Aktiengesellschaft, München, Germany

[21] Appl. No.: 397,093

[22] PCT Filed: Oct. 4, 1993

[86] PCT No.: PCT/DE93/00930

§ 371 Date: Mar. 6, 1995

§ 102(e) Date: Mar. 6, 1995

[87] PCT Pub. No.: WO94/09553

PCT Pub. Date: Apr. 28, 1994

[30] Foreign Application Priority Data

Oct. 15, 1992 [DE] Germany ............... 9213945.0 U

[51] Int. Cl.⁶ ............................................. H02K 17/42
[52] U.S. Cl. .................... 310/168; 310/112; 310/154; 310/179; 310/258; 310/91
[58] Field of Search ............................... 310/168, 112, 310/154, 179, 258

[56] References Cited

U.S. PATENT DOCUMENTS

| | | | |
|---|---|---|---|
| 4,550,280 | 10/1985 | Freise | 318/701 |
| 4,584,513 | 4/1986 | Freise et al. | 318/701 |
| 4,587,449 | 5/1986 | West | 310/154 |
| 5,214,336 | 5/1993 | Schmidt et al. | 310/254 |
| 5,280,211 | 1/1994 | Freise et al. | 310/168 |
| 5,319,336 | 6/1994 | Alcon | 335/296 |
| 5,347,191 | 9/1994 | Wood | 310/113 |
| 5,444,313 | 8/1995 | Oudet | 310/17 |

Primary Examiner—Thomas M. Dougherty
Assistant Examiner—Elvin G. Enad
Attorney, Agent, or Firm—Kenyon & Kenyon

[57] ABSTRACT

In the case of a stator-excited starter-generator, a permanent magnet arrangement, which is magnetized in the opposite direction to the winding excitation, and has yoke overhangs which are radial with respect to the adjacent sector elements, is arranged in the axial separating space of two sector stator elements, which are arranged axially one behind the other each stator element is winding-excited by an excitation winding part of opposite polarity.

20 Claims, 2 Drawing Sheets

MOTOR AND/OR GENERATOR OPERATING ON THE RELUCTANCE PRINCIPLE

BACKGROUND OF THE INVENTION

The present invention relates generally to motors and/or generators, and more particularly to a motor and/or generator operating on the reluctance principle, and having the following features:

a) the stator has sector stators (SS) which are distributed over the circumference of the rotor (R) and which are magnetically isolated from one another;

b) each sector stator (SS) includes two toothed sector stator elements (SS1 and SS2, respectively) which are arranged one behind the other with an axial separation (a) and have common power windings (winding strands S1–S4) which are accommodated in slots between the stator teeth (SZ);

c) each sector stator element (SS1 or SS2, respectively) in each case opens into radially projecting pole limbs (PS1 and PS2, respectively) which can in each case be excited in the direction of opposite polarity by an excitation winding part (EW1 or EW2, respectively) which loops around them, and which pole limbs (PS1 and PS2, respectively) are connected radially on the outside by a magnetic return path yoke (J); and d) an axially magnetized permanent magnet arrangement (M), which is magnetized in the opposite direction to the winding excitation in the sector stator elements, is arranged in the axial separating space between the sector stator elements (SS1 and SS2, respectively).

A starter-generator operating on the principle of the stator-excited synchronous machine of sector construction, having the features a)–c) discussed above, is disclosed in EP-B1-0,103,821. A starter-generator having the features a)–d) above is disclosed in PCT/EP 91/00302.

In the first-mentioned case, which is disclosed in EP-B1-0,103,821, the sector-stator elements of a sector stator are mutually isolated from one another by means of an axial separating space. The cylindrical envelope surface of a flywheel, especially of the clutch of a motor vehicle internal combustion engine, which is also used as the rotor of the motor and/or generator is designed in the form of two toothed rotors which are arranged offset with a gap, with a specific axial separation.

According to PCT/EP 91/00302, an axially magnetized permanent magnet arrangement, which is magnetized in the opposite direction to the winding excitation in the sector stator elements, is arranged in the axial separating space between the sector stator elements, in such a manner that its magnetic field is closed axially/tangentially and radially in the yokes of the sector stator elements, radially via the stator teeth, the air gap and the offset rotor poles, and axially/tangentially via the rotor yoke. As a result of the interaction of the excitation, which can be controlled by the excitation winding parts, on the one hand, and the permanent magnetization provided by the permanent magnet arrangement, on the other hand, a reduction in the excitation winding copper is possible with the excitation being easily controllable, and an undesirable, large stray field, primarily between the end surfaces of the laminated cores, which are located axially one in front of the other, of the sector stator elements, can be avoided. On its rear, outer radial edge regions, the magnet arrangement is adjacent to and flush with the edge regions of the sector stator elements which rest thereon axially.

The present invention is directed to the problem of developing a motor and/or generator of the above-mentioned type in which additional protection against undesirable stray fluxes can be achieved.

SUMMARY OF THE INVENTION

The present invention solves this problem by providing a radial yoke overhang on the permanent magnet arrangement, which arrangement is inserted such that it rests axially between the two laminated cores of the sector stator elements. The radial yoke overhang is provided on the free radial edge regions of the permanent magnet arrangement with respect to the axially adjacent sector stator elements. This design provides additional stray field suppression between the radial rear end surfaces of the sector stator elements as well. Advantageous refinements of the present invention are in each case the subject matter of the dependent claims.

A particularly good effect against undesirable stray fluxes of the permanent magnet arrangement is additionally provided if the magnet arrangement comprises magnet parts which in each case essentially cover both the yoke bow and the stator teeth of a sector stator element. According to PCT/EP 91/00302, according to a special refinement, an integral, sintered shaped magnet is provided for such a permanent magnet arrangement. It has been found that such sintered shaped magnets can be manufactured only at high cost, particularly because of the complicated stator teeth, which have to be constructed integrally with the yoke bow. A different solution has thus been made use of, by designing the new magnet arrangement in two parts and by holding the magnet parts, which cover the stator teeth of the sector stator elements, as separate block-like sintered magnets, essentially by bonding in between the adjacent sector stator elements.

An advantageous integral permanent magnetic arrangement which essentially covers both the yoke bow and the stator teeth of the sector stator elements and at the same time also surrounds the radial yoke overhangs can be achieved at a low manufacturing cost, and serviceability even in the case of rugged operation can be ensured, according to a preferred refinement of the invention, in that the permanent magnet arrangement is formed from a plastic-bonded shaped magnet having a mixture of ferrite particles and other magnetic particles with a comparatively relatively high magnetic coercivity field strength.

Such a permanent magnet arrangement allows, on the one hand, the maximum separation between the two sector stator elements for prevention of undesired stray fluxes to be achieved even in the case of a plastic-bonded shaped magnet which is advantageous for the design of complicated shapes (yoke bow; stator teeth; yoke overhangs) and which, with a manufacturing-dependent maximum element of approximately 80% of magnetic particles on the one hand ensures, by the admixture of relatively high quality magnetic particles, the adequate coercivity field strength for operation of the stator generator and, on the other hand, by the admixture of low-quality ferrite particles, keeps an acceptable cost outlay within limits; the mixture ratio of the various magnetic particles is accordingly determined by the optimum ratio for an integral permanent magnet arrangement which on the one hand is cost-effective and on the other hand ensures the necessary coercivity field strength. Samarium-cobalt particles and/or neodymium-iron-boron particles are provided in an advantageous manner as an admixture to the ferrite particles.

DETAILED DESCRIPTION

Figure 1:
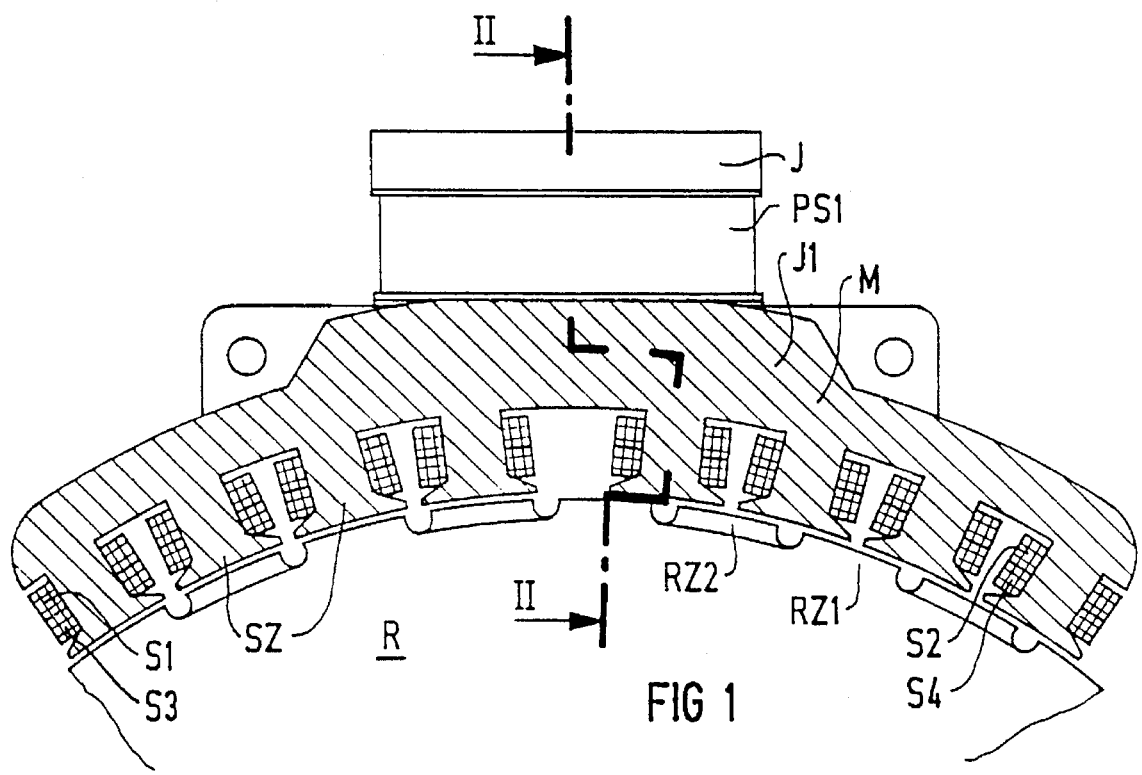
FIG. 1 shows an end plan view of a sector stator element having a permanent magnet arrangement placed axially in front, on the section line I—I in FIG. 2.
Figure 2:
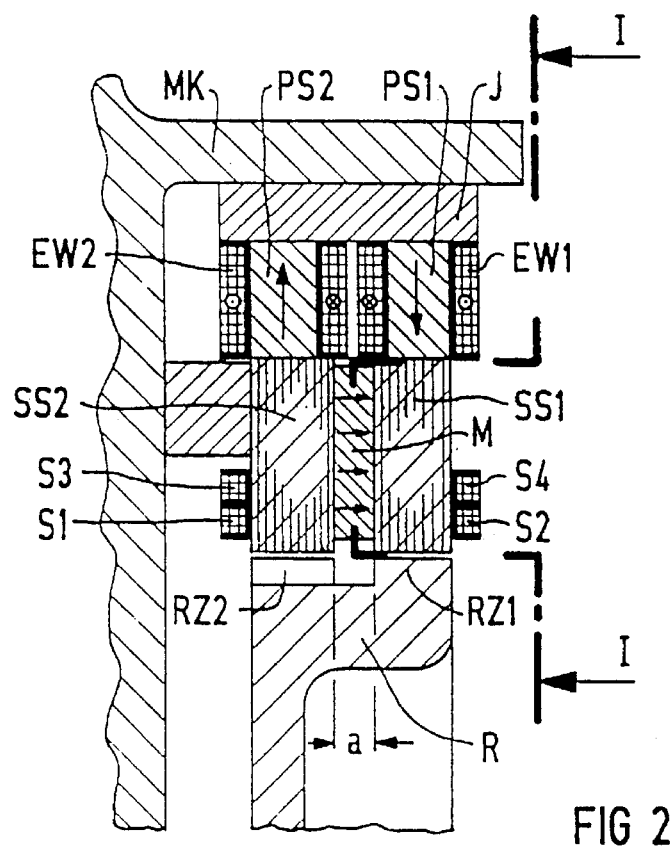
FIG. 2 shows the sector stator installed in the internal combustion engine in a motor vehicle, according to the detail illustration in FIG. 1, in side section on the section line II—II.

FIG. 1 shows an individual sector stator SS on the section line I—I in FIG. 2, which, according to FIG. 2, is mounted, for example, on the engine crankcase MK of a motor vehicle internal combustion engine and extends over a circumferential angle of, for example, approximately 70 degrees over the flywheel, which is also used as the rotor R, of the internal combustion engine. Although, in the case of the pole division and winding division illustrated here, the functionality of the motor and/or generator according to the invention is intrinsically provided even in the case of only a single sector stator SS on the entire circumference, sector stators which are in each case arranged in pairs with a tangential separation are expediently arranged on the circumference of the engine crankcase in such a manner that they are approximately opposite and, in the case of electrical interconnection of the sector stators which are distributed on the circumference, the voltages induced in one strand in each case are in-phase overall.

The sector stator SS which is illustrated in FIGS. 1 and 2 includes two sector stator elements SS1 and SS2 respectively which are isolated, one behind the other, with an axial separation a. Each sector stator element SS1 or SS2 respectively has a total of eight stator teeth SZ which are arranged such that they are axially aligned, one behind the other. A 4-strand winding having winding strands S1, S2, S3, S4 which are in each case offset through 90 electrical degrees with respect to one another and have the same coil width are provided as the stator power winding. In the exemplary embodiment illustrated here, winding strands S1 and S3 are in each case wound around the teeth of the left-hand tooth group of the sector stator SS, and the winding strands S2 and S4 are in each case wound around the teeth of the right-hand tooth group of the sector stator SS, in such a manner that they loop around two stator teeth which are located axially one behind the other.

Each sector stator element SS1 or SS2 respectively opens into a radially projecting pole limb PS1 or PS2 respectively which in each case has looping around it a concentrated excitation winding part EW1 or EW2 respectively, which is advantageously constructed as a shaped coil which can be plugged on radially. As can be seen especially in FIG. 2, the excitation winding parts EW1 and EW2, respectively, are connected to a controllable DC voltage in such a manner that the current direction is the same in both coil sides located between the sector stator elements SS1 and SS2. The pole ends of the pole limbs PS1 and PS2 are connected by means of a magnetic return path yoke J.

The outer circumference of the clutch flywheel of a motor vehicle internal combustion engine is also used as the rotor R, in such a manner that two rows of teeth are produced on the circumference which are associated with the rows of teeth of the stator teeth SZ on the first and second sector stator elements SS1 and SS2, respectively, and have rotor teeth RZ1 and RZ2 respectively which are offset with respect to one another with an axial separation and with an axial gap. The two rows of teeth are magnetically conductively connected, since they are parts of the solid iron clutch flywheel.

An axially magnetized permanent magnet arrangement M is provided in the axial separating space between the sector stator elements SS1 and SS2 respectively, which permanent magnet arrangement M comprises a yoke bow magnet part (J1) which essentially covers the yoke part and a magnet part which is integral therewith and essentially covers the stator teeth SZ. The permanent magnet arrangement M is magnetized in such a manner that it is directed in the opposite direction to a stray field, which occurs in the axial separating space between the sector stator elements, of the excitation field, which is produced by the excitation winding parts EW1 and EW2, when the permanent magnet arrangement M is not present.

Without any excitation current in the excitation winding parts EW1 and EW2, respectively, the magnetic return path via the magnetic return path yoke J reduces the magnetic potential of the permanent magnet arrangement M on the air gap between the stator teeth SZ and the rotor R, and thus also the air gap excitation field, to a non-critical residual level; the cross-section of the magnetic return path is to this end expediently designed such that it can short-circuit even the remanence flux of the permanent magnet arrangement virtually without being saturated. When the excitation winding parts EW1 and EW2 are live, their magnetic potential on the air gap becomes effective on the air gap between the stator teeth SZ and the rows of rotor teeth RZ1 and RZ2, respectively, on the rotor R; above a sufficient excitation current intensity in the excitation winding parts EW1 and EW2, the flux through the magnetic return path of the magnetic return path yoke J changes it mathematical sign and, after this, passes over the air gap together with the permanent magnet flux from the permanent magnet arrangement M, as the effective excitation flux.

The advantage of this combination of permanent magnet excitation by the permanent magnet arrangement M, on the one hand, and electrical excitation by the excitation winding parts EW1 and EW2 respectively, on the other hand, becomes clear when the following is considered:

If the stator and/or generator had been designed just with a permanent magnet arrangement M, then the excitation field would be unchanging because of the magnetic return path, which would then be unacceptable, between the laminated cores of the sector stator elements SS1, SS2; if the excitation were carried out purely electrically via the excitation winding parts EW1 and EW2, then a very large undesirable stray field would result between the end surfaces of the laminated cores, which are located one in front of the other with an axial separation between them, of the sector stator elements SS1 and SS2.

Figure 3:
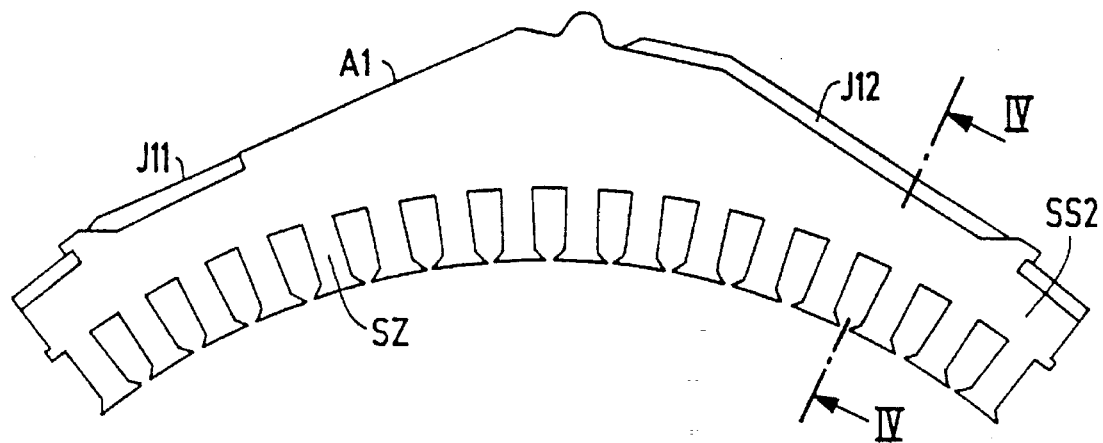
FIG. 3 shows the axial plan view of a sector stator having a permanent magnet arrangement which overhangs the outer radial edge regions of said sector stator and is arranged axially between the sector stator elements.
Figure 4:
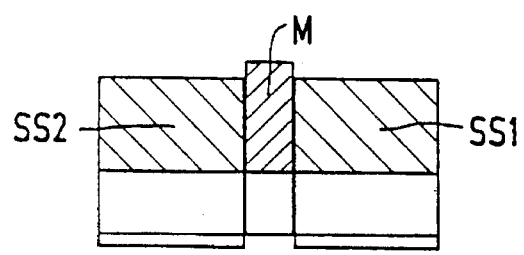
FIG. 4 shows a section illustration through the sector stator according to FIG. 3, on the section line IV—IV.

As can be seen from FIGS. 3, 4 with reference to a sector stator which is provided with a uniform tooth pitch over its hole circumference, the yoke bow J1 of the magnet arrangement has radial, rear-side yoke overhangs J11 and J12 respectively with respect to the adjacent radial rear-side edge surfaces of the sector stator elements SS1 and SS2 respectively, on both sides of a bearing surface A1 which is provided for the fitting of discrete pole limbs, in such a manner that stray fluxes between the radial edge surfaces of the sector stator elements SS1 and SS2 respectively of a sector stator can also be counteracted in an advantageous and simple manner.

In the case of the exemplary embodiment according to FIG. 3, in order to achieve a reduced axial structural height, the bearing surface A1 for the associated pole limb is offset laterally with respect to the symmetry center line ML of the sector stator and, in consequence, the pole limb—which is not illustrated here—can be fitted such that it is tilted away laterally; the left-hand radial yoke overhang J11 is accordingly tangentially shorter than the right-hand radial yoke overhang J12, which is to the right of the bearing surface A1.

I claim:

1. A motor operating on the reluctance principle, comprising:
   a) a rotor having a circumference;
   b) a stator having a plurality of sector stators, which are distributed over the circumference of the rotor and are magnetically isolated from one another, wherein each sector stator includes:
      (i) two sector stator elements being disposed axially one behind the other with an axial separation (a), having a plurality of teeth, and having a plurality of common power windings; and
      (ii) a plurality of slots formed between the plurality of stator teeth, in which slots the common power windings are disposed;
   c) a plurality of radially projecting pole limbs, wherein each sector stator element opens into the plurality of radially projecting pole limbs;
   d) a plurality of excitation winding parts, each one of which loops around one of the plurality of radially projecting pole limbs, which pole limbs can be excited in a direction of opposite polarity by the excitation winding part which loops around them;
   e) a magnetic return path yoke, wherein the plurality of pole limbs are coupled radially on their exterior by the magnetic return path yoke; and
   f) an axially magnetized permanent magnet arrangement being magnetized in an opposite direction to a stray field produced by the excitation winding parts, being disposed in the axial separating space between the sector stator elements, and having a plurality of radial yoke overhangs, one for each of the sector stator elements, to suppress any stray flux between radial edge regions of adjacent sector stator elements.

2. The motor according to claim 1, wherein each of the plurality of radial yoke overhangs extend tangentially on both sides of the pole limb associated with each of the sector stator elements.

3. The motor according to claim 1, wherein each of the sector stator elements has a bearing surface, the radial yoke overhangs on each of the sector stator elements extend tangentially on both sides of the bearing surface, and each of the plurality of pole limbs can be coupled to the sector stator elements as a discrete component.

4. The motor according to claim 2, wherein the radial yoke overhangs have different tangential lengths from one another corresponding to the pole limbs and have bearing surfaces on which the pole limbs are in each case disposed laterally offset with respect to a radial symmetry center line of the sector stator element.

5. The motor according to claim 3, wherein a radial height of the radial yoke overhangs corresponds to a radial height of the bearing surfaces.

6. The motor according to claim 4, wherein a radial height of the radial yoke overhangs corresponds to a radial height of the bearing surfaces.

7. The motor according to claim 1, further comprising a yoke bow, wherein the permanent magnet arrangement comprises an integral plastic-bonded shaped magnet which at least partially covers both the stator teeth and the yoke bow which connects them and has a mixture of ferrite particles and other magnetic particles having a relatively high magnetic coercivity field strength.

8. The motor according to claim 7, wherein the mixture of ferrite particles comprises on the one hand ferrite particles and on the other hand Samarium-Cobalt (SmCo) particles.

9. The motor according to claim 7, wherein the mixture of ferrite particles comprises on the one hand ferrite particles and on the other hand Neodymium-Iron-Boron (NdFeB) particles.

10. The motor according to claim 7, wherein a mixture ratio of the various magnetic particles is determined by an optimum ratio for an integral permanent magnet arrangement which on the one hand is cost-effective and on the other hand ensures the necessary coercivity field strength.

11. A generator operating on the reluctance principle, comprising:
    a) a rotor having a circumference;
    b) a stator having a plurality of sector stators, which are distributed over the circumference of the rotor and are magnetically isolated from one another, wherein each sector stator includes:
       (i) two sector stator elements being disposed axially one behind the other with an axial separation (a), having a plurality of teeth, and having a plurality of common power windings; and
       (ii) a plurality of slots formed between the plurality of stator teeth, in which slots the common power windings are disposed;
    c) a plurality of radially projecting pole limbs, wherein each sector stator element opens into the plurality of radially projecting pole limbs;
    d) a plurality of excitation winding parts, each one of which loops around one of the plurality of radially projecting pole limbs, which pole limbs can be excited in a direction of opposite polarity by the excitation winding part which loops around them;
    e) a magnetic return path yoke, wherein the plurality of pole limbs are coupled radially on their exterior by the magnetic return path yoke; and
    f) an axially magnetized permanent magnet arrangement being magnetized in an opposite direction to a stray field produced by the excitation winding parts, being disposed in the axial separating space between the sector stator elements, and having a plurality of radial yoke overhangs, one for each of the sector stator elements, to suppress any stray flux between radial edge regions of adjacent sector stator elements.

12. The generator according to claim 11, wherein each of the plurality of radial yoke overhangs extend tangentially on both sides of the pole limb associated with each of the sector stator elements.

13. The generator according to claim 12, wherein each of the sector stator elements has a bearing surface, the radial yoke overhangs on each of the sector stator elements extend tangentially on both sides of the bearing surface, and each of the plurality of pole limbs can be coupled to the sector stator elements as a discrete component.

14. The generator according to claim 12, wherein the radial yoke overhangs have different tangential lengths from one another corresponding to the pole limbs and have bearing surfaces on which the pole limbs are in each case disposed laterally offset with respect to a radial symmetry center line of the sector stator element.

15. The generator according to claim 13, wherein a radial height of the radial yoke overhangs corresponds to a radial height of the bearing surfaces.

16. The generator according to claim 14, wherein a radial height of the radial yoke overhangs corresponds to a radial height of the beating surfaces.

17. The generator according to claim 11, further comprising a yoke bow, wherein the permanent magnet arrangement comprises an integral plastic-bonded shaped magnet which at least partially covers both the stator teeth and the yoke bow which connects them and has a mixture of ferrite particles and other magnetic particles having a relatively high magnetic coercivity field strength.

18. The generator according to claim 17, wherein the mixture of ferrite particles comprises on the one hand ferrite particles and on the other hand Samarium-Cobalt (SmCo) particles.

19. The generator according to claim 17, wherein the mixture of ferrite particles comprises on the one hand ferrite particles and on the other hand Neodymium-Iron-Boron (NdFeB) particles.

20. The generator according to claim 17, wherein a mixture ratio of the various magnetic particles is determined by an optimum ratio for an integral permanent magnet arrangement which on the one hand is cost-effective and on the other hand ensures the necessary coercivity field strength.

* * * * *